(12) United States Patent
Shen (10) Patent No.: US 11,314,794 B2
(45) Date of Patent: Apr. 26, 2022

(54) SYSTEM AND METHOD FOR ADAPTIVELY ADJUSTING RELATED SEARCH WORDS

(71) Applicant: INDUSTRIAL TECHNOLOGY RESEARCH INSTITUTE, Hsinchu (TW)

(72) Inventor: Min-Hsin Shen, Taichung (TW)

(73) Assignee: INDUSTRIAL TECHNOLOGY RESEARCH INSTITUTE, Hsinchu (TW)

(*) Notice: Subject to any disclaimer, the term of this patent is extended or adjusted under 35 U.S.C. 154(b) by 578 days.

(21) Appl. No.: 16/220,123

(22) Filed: Dec. 14, 2018

(65) Prior Publication Data

US 2020/0192922 A1    Jun. 18, 2020

(51) Int. Cl.
*G06F 16/33* (2019.01)
*G06F 16/31* (2019.01)

(52) U.S. Cl.
CPC ........ *G06F 16/3334* (2019.01); *G06F 16/313* (2019.01); *G06F 16/3346* (2019.01); *G06F 16/3349* (2019.01)

(58) Field of Classification Search
CPC ............... G06F 16/3334; G06F 16/313; G06F 16/3346; G06F 16/3349
See application file for complete search history.

(56) References Cited

U.S. PATENT DOCUMENTS 6,772,150 B1    8/2004 Whitman et al.
8,082,278 B2   12/2011 Agrawal et al.
(Continued)

FOREIGN PATENT DOCUMENTS

CN    102184173 A    9/2011
CN    103324646 A    9/2013
(Continued)

OTHER PUBLICATIONS

Tsai, Chih-Hao, "MMSEG: A Word Identification System for Mandarin Chinese Text Based on Two Variants of the Maximum Matching Algorithm", Chih-Hao Tsai's Technology Page, Apr. 29, 1996, 10 pages.
Wikipedia, "Pointwise mutual information", May 24, 2018, Retrieved from the Internet <https://en.wikipedia.org/w/index.php?title=Pointwise_mutual_information&oldid=842750020>, 4 pages.

*Primary Examiner* — Jensen Hu
(74) *Attorney, Agent, or Firm* — Birch, Stewart, Kolasch & Birch, LLP (57) ABSTRACT

A system for adaptively adjusting related search words are provided. The system includes an input device, a search log collection module, a threshold setting module and a process evolution module. The input device receives a search word. The search log collection module determines whether the cumulative search count of the search word is greater than a first threshold or less than a second threshold. The threshold setting module sets the first threshold and the second threshold in terms of the number of search logs. When the cumulative search count of the search word is between the first threshold and the second threshold, the process evolution module optimizes the middle search process to find out at least one related word and/or at least one historical search word most related to the attributes or content of the search word from the indexed text and the historical search log.

17 Claims, 4 Drawing Sheets

(56) References Cited

U.S. PATENT DOCUMENTS

| | | | |
|---|---|---|---|
| 8,346,757 B1 * | 1/2013 | Lamping | G06F 16/3334 |
| | | | 707/713 |
| 8,392,435 B1 | 3/2013 | Yamauchi | |
| 8,954,422 B2 | 2/2015 | Hasan et al. | |
| 8,954,463 B2 | 2/2015 | Rajput et al. | |
| 9,015,176 B2 | 4/2015 | Cava | |
| 2008/0140644 A1 * | 6/2008 | Franks | G06F 16/40 |
| 2008/0235187 A1 | 9/2008 | Gade et al. | |
| 2008/0256035 A1 * | 10/2008 | Zhang | G06F 16/3322 |
| 2009/0319517 A1 * | 12/2009 | Guha | G06Q 30/02 |
| 2010/0262603 A1 | 10/2010 | Odom et al. | |
| 2014/0207746 A1 | 7/2014 | Song et al. | |
| 2016/0140213 A1 | 5/2016 | Kasai | |
| 2017/0169111 A1 | 6/2017 | Baum et al. | |

FOREIGN PATENT DOCUMENTS

| | | |
|---|---|---|
| CN | 102629257 B | 2/2014 |
| CN | 103077179 B | 8/2016 |
| CN | 105930376 A | 9/2016 |
| CN | 107256239 A | 10/2017 |
| TW | 200921422 A | 5/2009 |
| TW | 201015347 A | 4/2010 |
| TW | I421713 B | 1/2014 |
| TW | I499290 B | 9/2015 |
| TW | M523902 U | 6/2016 |
| TW | I543009 B | 7/2016 |

\* cited by examiner

SYSTEM AND METHOD FOR ADAPTIVELY ADJUSTING RELATED SEARCH WORDS

TECHNICAL FIELD

The disclosure relates in general to a system and a method for adaptively adjusting related search words.

BACKGROUND

When providing the search result of a search word to the user, the advanced search system normally provides other search words related to the search word for the user to quickly clarify his/her inquiry target due to the following reasons. Firstly, the user is rarely able to accurately describe his/her search intent using limited search words. Secondly, the search word or the search target given by the user may have veracious descriptions or meanings, such that the vocabularies used by the user do not match that used in the text. Thirdly, the user may have insufficient or incorrect understanding of the search target and therefore may use incorrect search words. Lastly, the user may have typos due to homonyms or different words with similar pronunciation. Generally, methods for retrieving related search words can be classified as content-based and log-based according to the difference of data sources. Content-based approaches focus on the content of indexed text, while log-based ones exploit historical search logs. At the initial stage when the search system is on line, the method based on the content of indexed text can immediately provide a recommendation list of related search words according to the correlation analysis of the words in the content of indexed text. However, the method based on the content of indexed text can only provide recommendation according to the fixed content of the text but cannot analyze and predict the user's search intent according to the historical search logs accumulated in the late stage. Conversely, the method based on historical search logs can predict the user's search intent according to the accumulated user data to obtain a better recommendation list of related search words, but cannot immediately provide recommendation at the initial stage. The method based on historical search logs needs to be used over a long period of time to accumulate a sufficient number of historical user data which can be used as a basis for the analysis and prediction of the user's search intent. A weight combination method can be obtained by integrating the above two methods through the use of weights, and can provide suitable recommendation of related search words no matter the search system is at the initial stage when historical search logs are unavailable or the search system has accumulated a sufficient number of historical user data at the late stage.

However, the weight combination method also has the data source problem of weight combination, and manual setting can hardly achieve the best effect. Normally, a sufficient number of search logs need to be accumulated before the first set of optimum weight combination can be obtained by using statistical models or machine learning approaches. However, the weight combination method still has the learning problem regarding vertical domain conversion. Therefore, the above retrieving technologies are adaptable to the search system at different on-line stages respectively. Since the number of search logs varies at different stages, the search system may not be able to immediately provide suitable recommendation of related search words to the user. Therefore, it has become a prominent task for the industries to resolve the above problems.

SUMMARY

The disclosure is directed to a system and a method for adaptively adjusting related search words according to the number of search logs accumulated in the system to provide suitable recommendation of related search words to the user.

According to one embodiment, a system for adaptively adjusting related search words is provided. The system includes an input device, a search log collection module, a threshold setting module and a process evolution module. The input device receives a user input and generates a search word. The search log collection module determines whether the cumulative search count of the search word is greater than a first threshold or less than a second threshold. The threshold setting module sets the first threshold and the second threshold in terms of the number of search logs. The process evolution module adjusts a search process according to the number of search logs. When the cumulative search count of the search word is greater than the first threshold, the process evolution module finds out at least one historical search word related to the attributes or content of the search word according to a historical search log. When the cumulative search count of the search word is less than the second threshold, the process evolution module performs an initial search process to find out at least one related word related to the attributes or content of the search word from a text. When the cumulative search count of the search word is between the first threshold and the second threshold, the process evolution module optimizes a middle search process to find out at least one related word and/or at least one historical search word that are most related to the attributes or content of the search word from the text and the historical search log.

According to another embodiment, a method for adaptively adjusting related search words is provided. The method includes an input process, a search log collection process, a threshold setting process, and a process evolution process. The input process is performed to receive a user input and generate a search word. The search log collection process is performed to determine whether the cumulative search count of the search word is greater than a first threshold or less than a second threshold. The threshold setting process is performed to set the first threshold and the second threshold in terms of the number of search logs. The process evolution process is performed to adjust a search process according to the number of search logs. When the cumulative search count of the search word is greater than the first threshold, at least one historical search word related to the attributes or content of the search word is found out from a historical search log. When the cumulative search count of the search word is less than the second threshold, an initial search process is performed to find out at least one related word related to the attributes or content of the search word from a text. When the cumulative search count of the search word is between the first threshold and the second threshold, a middle search process is optimized and performed to find out at least one related word and/or at least one historical search word that are most related to the attributes or content of the search word from the text and the historical search log.

The above and other aspects of the disclosure will become better understood with regard to the following detailed description of the preferred but non-limiting embodiment(s). The following description is made with reference to the accompanying drawings.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

Detailed descriptions of the disclosure are disclosed below with a number of embodiments. However, the disclosed embodiments are for explanatory and exemplary purposes only, not for limiting the scope of protection of the disclosure. Similar/identical designations are used to indicate similar/identical elements. Directional terms such as above, under, left, right, front or back are used in the following embodiments to indicate the directions of the accompanying drawings, not for limiting the present disclosure.

According to an embodiment of the present disclosure, a system for adaptively adjusting related search words is provided. The search system is such as a search engine with self-adjusted search process. For the search engine using the present system, before a sufficient number of search logs are accumulated at the initial stage, the search system finds out at least one related word related to the attributes or content of the search word from the text according to the indexed text and the index word list to create an initial related search word list. Then, after a certain number of search logs are accumulated in the middle stage, the search system finds out at least one related word and/or at least one historical search word that are most related to the attributes or content of the search word from the indexed text and the historical search log respectively according to a certain number of historical search logs and the initial indexed text to create a middle related search word list. Then, after a sufficient number of search logs are accumulated at the late stage, the search system directly finds out at least one historical search word related to the attributes or content of the search word according to the search word input by the user to create a late related search word list.

As disclosed above, the search system achieves self-optimization according to the number of search logs accumulated from different stages, such that the process evolution module can smoothly evolve from the initial stage lacking user action logs (search logs) to the late stage mainly depending on user action logs (search logs) to provide suitable recommendation of related search words to the user.

Figure 1:
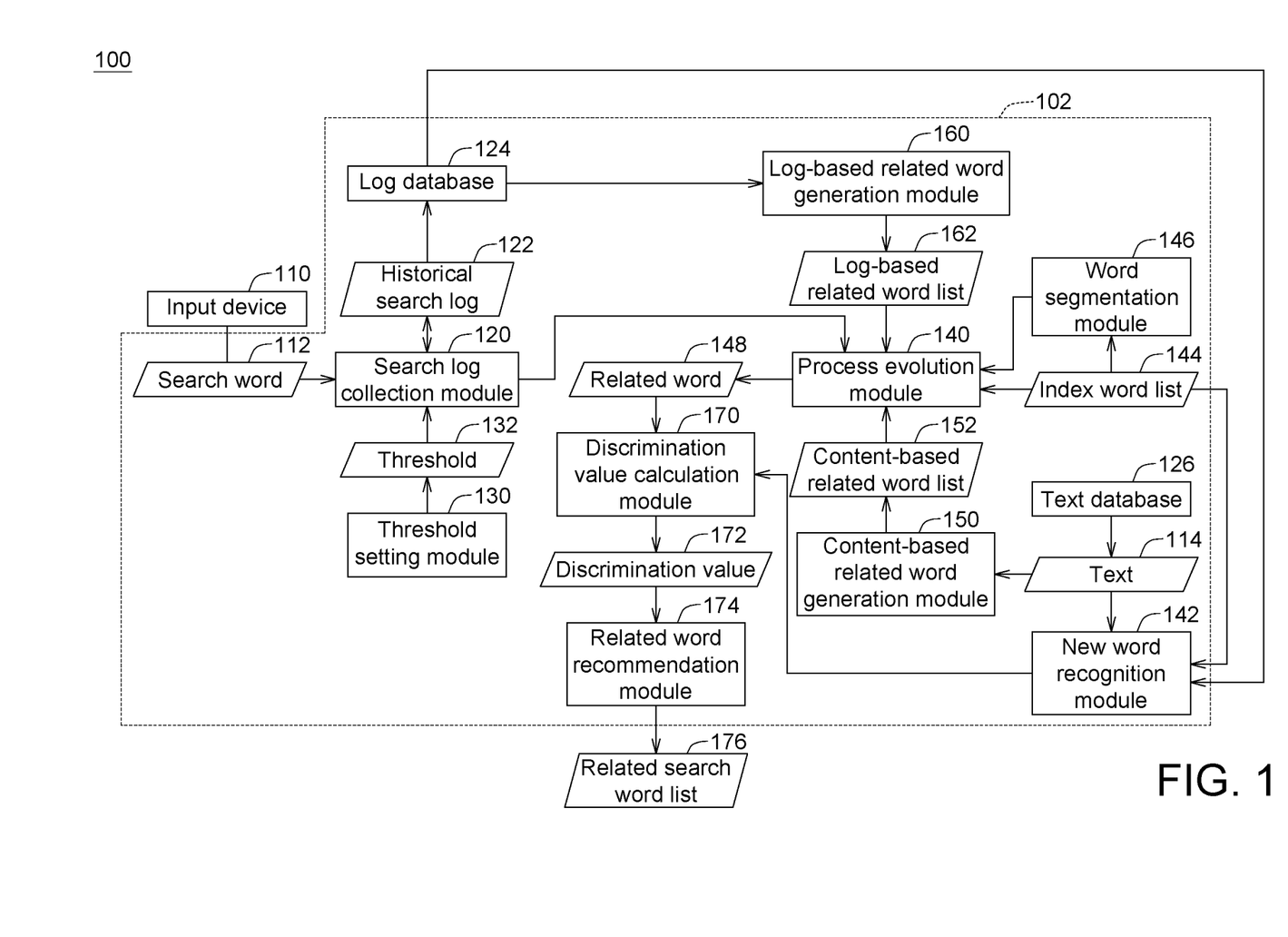
FIG. 1 is a schematic diagram of a system for adaptively adjusting related search words according to an embodiment of the present disclosure.

Refer to FIG. 1. According to an embodiment of the present disclosure, the system 100 for adaptively adjusting related search words includes an input device 110, a search log collection module 120, a threshold setting module 130 and a process evolution module 140. The input device 110 receives a user input and generates a search word 112. The search log collection module 120 determines whether the cumulative search count of the search word 112 is greater than a first threshold or less than a second threshold (represented by a threshold 132). The threshold setting module 130 sets the first threshold and the second threshold in terms of the number of search logs. Besides, the process evolution module 140 adjusts a search process according to the number of search logs.

In an embodiment, the input device 110, such as a user interface, reads the data input by the user, wherein the data can be input in the form of texts, symbols, and/or voices. Let a computer or a remote server be taken for example. The input device 110 can be realized by a portable electronic device connected to a computer or a remote server, but the present disclosure is not limited thereto. For example, after the input device 110 inputs the search word 112 to the computer or the remote server, the search engine 102 using the present system 100 searches the Internet or a local text database. The database includes a log database 124 and a text database 126. The text database 126 stores the source of the text 114 for search, such as text files and/or database fields. Examples of text files include product manual files, advertising proposal files, product test report files, and web-page files. Examples of database fields include the data fields of a commodity database, wherein the data fields are such as commodity name, keyword, commodity description, and brand. The log database 124 stores the historical search log 126 of the user.

The search log collection module 120 collects the user's operations on the present system 100. The user's operations on the system 100 provide information such as search words, click positions, hit counts, browsing time, and the attributes or content of each search word 112. The search log collection module 120 collects the above information to form a historical search log 126, and further stores the historical search log 126 to the log database 124. The attributes or content of the search word 112 can be product Chinese name, product English name, product short name, product brand, product model, product function, and competitive brands, but the present disclosure is not limited thereto. For example, the attributes or content of the search word 112 can be determined according to dictionary definitions, user-defined semantics, manually edited open sources (such as Wikipedia, DBpedia, and open directory project) or statistical proper noun recognition (such as name entity recognition). After the attributes or content of the search word 112 are determined, the present system 100 searches related words 148 according to the attributes or content of the search word 112.

Moreover, the present system 100 can further use the search engine 102 to analyze and re-construct the syntax of the search word 112, filter the vocabularies irrelevant to the attributes or content of the search word 112 off the text 114 and/or the historical search log 126 to assure the accuracy and comprehensiveness of data retrieval.

Figure 2:
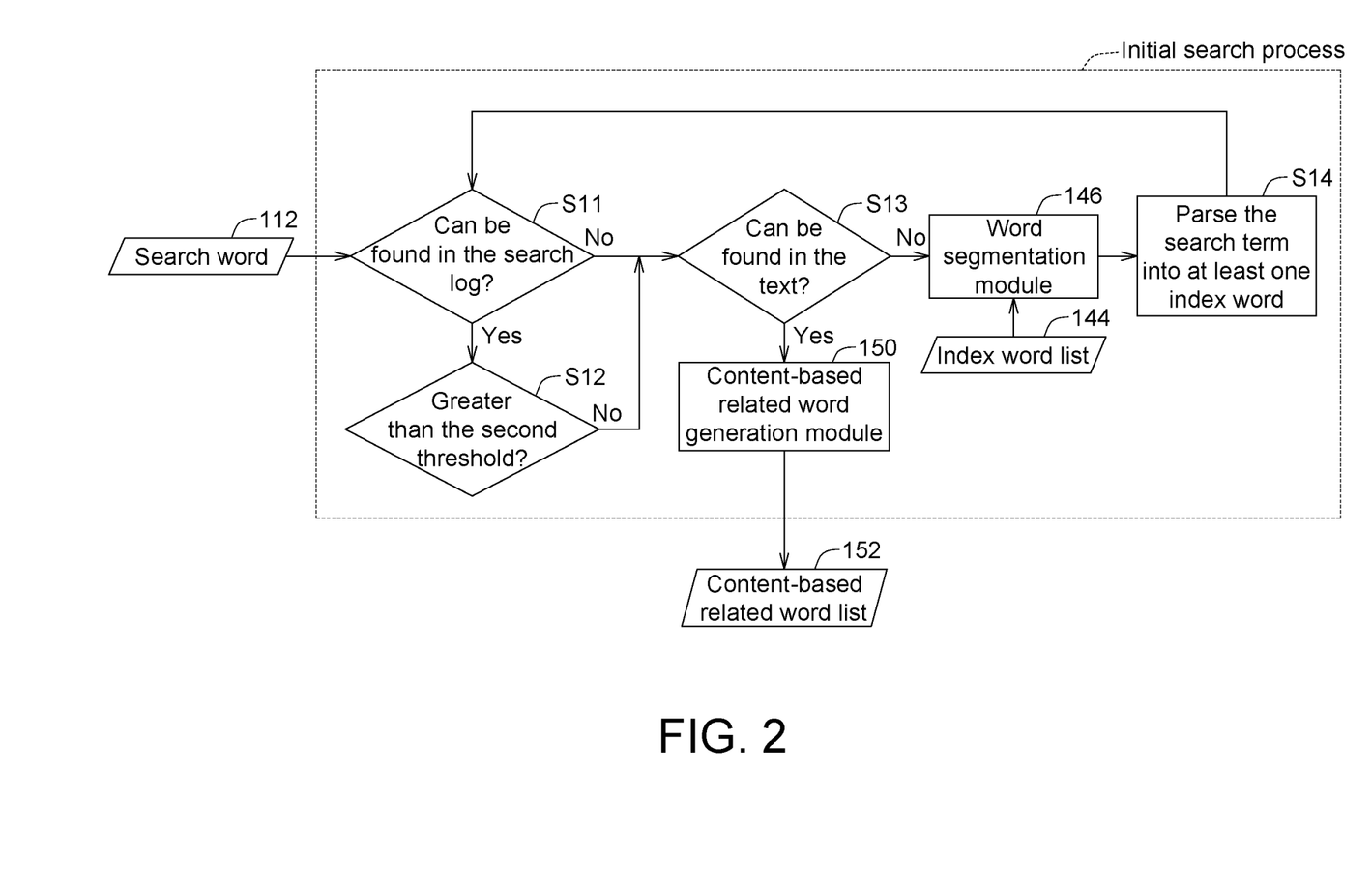
FIG. 2 is a schematic diagram of a system for adaptively adjusting related search words performing an initial search process according to an embodiment of the present disclosure.
Figure 3:
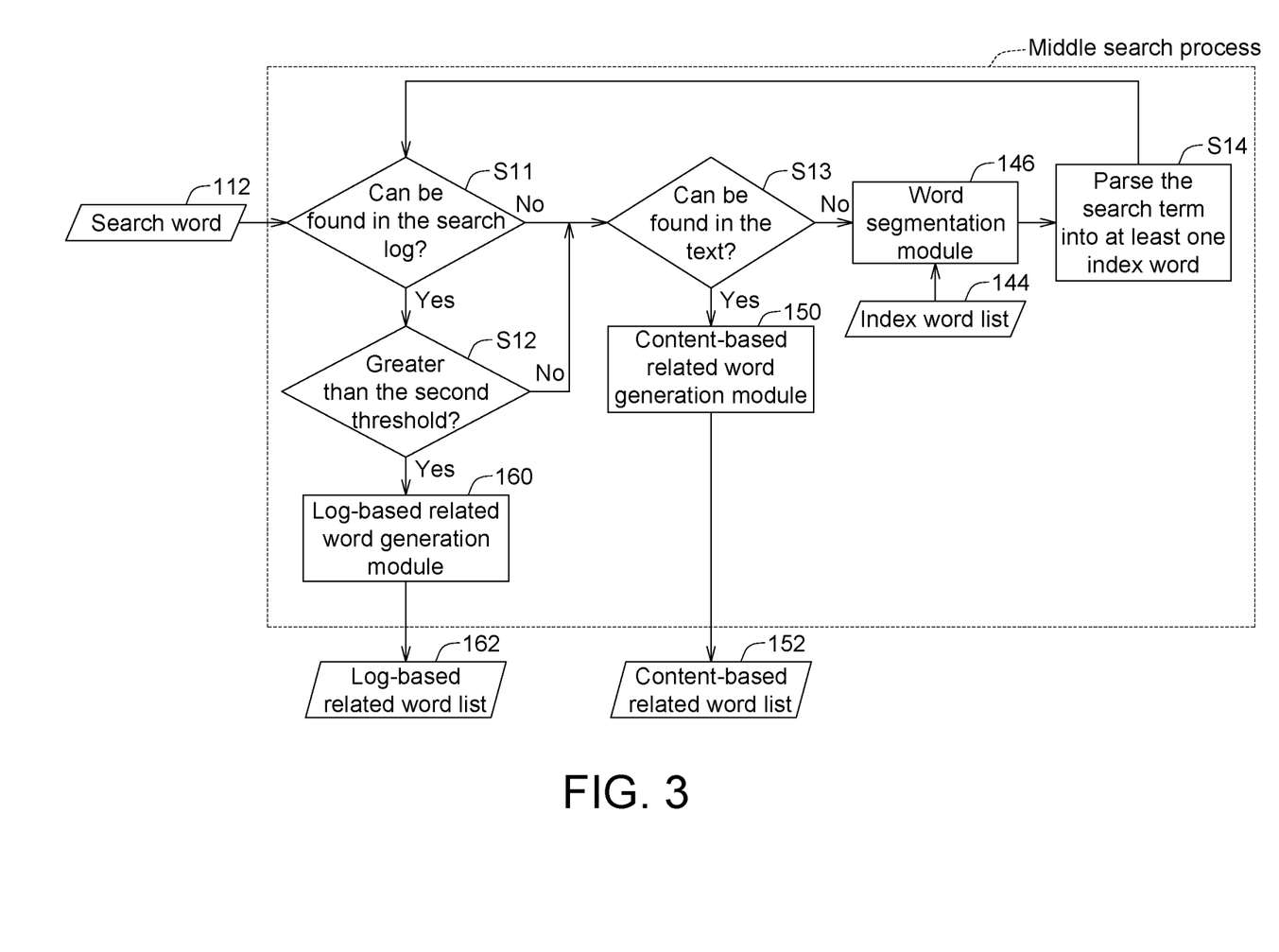
FIG. 3 is a schematic diagram of a system for adaptively adjusting related search words optimizing a middle search process according to an embodiment of the present disclosure.
Figure 4:
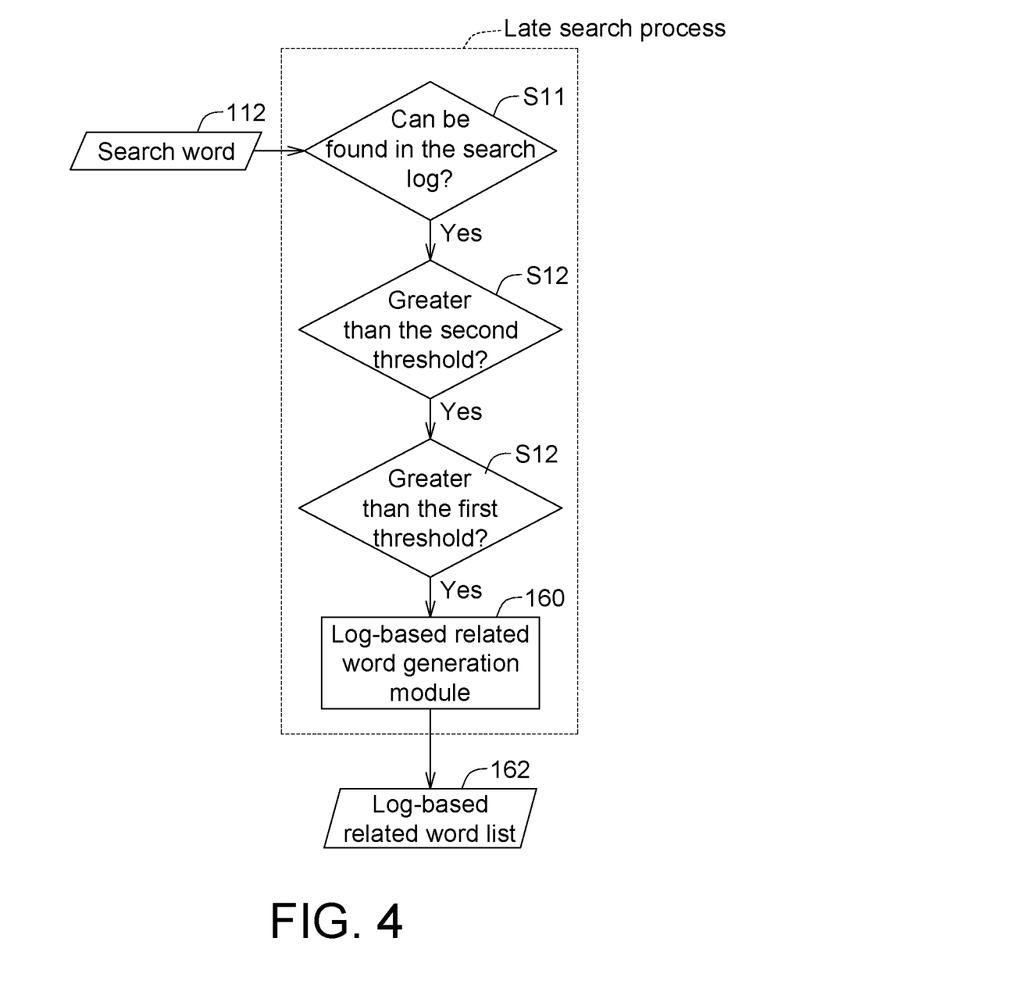
FIG. 4 is a schematic diagram of a system for adaptively adjusting related search words performing a late search process according to an embodiment of the present disclosure.

Additionally, the threshold setting module 130 sets the first threshold and the second threshold in terms of the number of search logs. The number of search logs is not limited to the cumulative number of the search word 112 of the same vocabularies, but also includes the cumulative number of the search word 112 of different vocabularies with similar meanings. When different users search the search word 112 of the same or different vocabularies, the system 100 can accumulate or weight the search logs of the search word 112 of the same or different vocabularies. When the cumulative number of search logs reaches a threshold 132, the process evolution module 140 of the system 100 adaptively adjusts the search process according to the number of search logs as indicated in FIGS. 2, 3 and 4.

Refer to FIG. 1. The present system 100 may further include a word segmentation module 146, a log-based related word generation module 160 and a content-based related word generation module 150. The index word list 144 contains a string list, wherein each string can be formed of one to multiple alphanumeric letters or symbols. The index word list can be pre-determined manually, or can be determined according to the dictionaries of general purpose or specific purpose, the index word list 144 formed of all string phrases obtained by the word segmentation module 146 after analyzing the content of the text 114, or a combination thereof. For example, the index word list can be determined according to the dictionaries of general purpose or specific purpose and the vocabularies obtained by the word segmentation module 146 after analyzing the content of the text 114. The content of the text 114 can be a document, a web-page, or a specific data list or data field designated by the database. For example, if the target of the search system is a commodity, then the content of the text 114 can be the content of database fields (such as commodity name, commodity description and commodity keyword) of a commodity data list in the commodity database, and the commodity description of a web-page.

The word segmentation module 146 parses a user-input search word 112 (such as Chinese words) into meaningful phrases. Suppose the user-input search word 112 is "wafer card reader". The word segmentation module 146 can parse the search word "wafer card reader" into "wafer" and "card reader", or only "card reader". Thus, when the search word 112 cannot be found in the text 114, the word segmentation module 146 performs character parsing, word parsing or word matching according to the index word list 144 and the search word 112 into at least one index word with which the search engine 102 searches the text 114. The said Chinese words can be parsed using a dictionary based segmentation algorithm (such as the forward maximum matching algorithm, the inverse maximum matching algorithm or the bidirectional maximum matching algorithm) or a corpus based algorithm (such as the conditional random fields (CRF) algorithm or the deep neural networks (DNN) algorithm), but the present disclosure is not limited thereto.

Additionally, the content-based related word generation module 150 analyzes the text 114 to find out the top M index words most related to the search word 112 according to the index word list 144 to generate a content-based related word list 152, wherein M is a positive integer, such as M=5 or M>5. In an embodiment, the content-based related word generation module 150 calculates a strength of relevance according to the probability at which the search word 112 and the index words appear in the text separately or concurrently. The higher the strength of relevance, the larger the relevance. Conversely, the lower the strength of relevance, the smaller the relevance. The strength of relevance can be calculated using the association rule learning method, the point-wise mutual Information (PMI) algorithm, the modified PMI algorithms, the Kullback-Leibler divergence algorithm, the normalized Google distance algorithm, or the Wordnet distance algorithm, but the present disclosure is not limited thereto.

Moreover, the log-based related word generation module 160 analyzes the relevance between any two historical search words in the historical search log 122 to find out the top N historical search words most related to the search word to generate a log-based related word list 162, wherein N is a positive integer, such as N=5 or N>5. In an embodiment, the log-based related word generation module 160 calculates a strength of relevance according to the probability at which the attributes or content of the search word and the historical search words appear in the historical search log 122 separately or concurrently. The higher the strength of relevance, the larger the relevance. Conversely, the lower the strength of relevance, the smaller the relevance. Besides, the relevance can be calculated according to other attributes (such as click position, hit count, or browsing time) of the search word in the historical search log 122 in addition to the position of the search word in the vocabulary. The strength of relevance can be calculated using the point-wise mutual Information (PMI) algorithm or other algorithms (such as the association rule learning method, the modified PMI algorithms, the Kullback-Leibler divergence algorithm, the normalized Google distance algorithm, or the Wordnet distance algorithm), but the present disclosure is not limited thereto.

Refer to FIG. 1. To optimize the middle search process, the present system 100 further includes a discrimination value calculation module 170 and a related word recommendation module 174. The discrimination value calculation module 170 calculates the discrimination value 172 of each related word 148 according to the text 114, the index word list 144, the log-based related word list 162 and the content-based related word list 152. The discrimination value 172 can be used for determining the degree of uniqueness of the related word 148. The degree of uniqueness is an index for measuring the degree of difference of the related word 148 in the text 114. The discrimination value 172 can also be used for increasing the diversity of the related word list to avoid the recommended related words being too similar to each other. When the related word 148 appears in a particular text 114 only, the related word 148 has a large discrimination value. When the related word 148 appears in multiple texts 114 concurrently, the related word 148 has a small discrimination value. That is, in multiple texts 114, the degree of uniqueness of a particular related word 148 is inversely proportional to the document frequency (DF) at which the related word 148 appears in the multiple texts 114. Therefore, the discrimination value calculation module 170 can calculate the discrimination value 172 of each related word 148 using the inverse document frequency (IDF) algorithm, the residual inverse document frequency (RIDF) algorithm or the discrimination power algorithm, but the present disclosure is not limited thereto. The discrimination value calculation module 170 can further create a match table between the related word 148 and the discrimination value 172 according to the discrimination value 172 of each related word 148.

In an embodiment, when a particular related word 148 can be found in the index word list 144, the discrimination value calculation module 170 directly calculates the discrimination value of the index word. When a given related word 148 cannot be found in the index word list 144, the discrimination value calculation module 170 further calculates the discrimination value of each index word of the parsed related word 148 after the given related word 148 is parsed by the word segmentation module 146 parses. Then, the discrimination value calculation module 170 estimates the discrimination value of the related word 148 according to a minimum, a maximum, an arithmetic mean, or a weighted average of the discrimination values of the parsed related words.

In an embodiment, the system 100 further includes a new word recognition module 142 configured to extract new words not included in the index word list from a given word. The new word recognition module 142 cab be implemented by using language rules (such as phonological rules or grammar rules or word formation rules), statistical models (such as the hidden Markov model (HMM), the conditional random fields (CRF) model, the support vector machine (SVM) model, and the deep neural network (DNN) model), or specific statistics (such as the point-wise mutual information (PMI) algorithm). When a given related word 148 cannot be found in the index word list 144, the new word recognition module 142 assigns discrimination values to partial strings retrieved from the related word 148 and recognized as new words. The discrimination value of each new word can be a pre-set fixed value or a maximum of the discriminations of all vocabularies in the index word list 144 or a weighted maximum. Of the related word, these strings of existing words are calculated according to the index word list 144. When these strings can be found in the index word list 144, then the discrimination value calculation module 170 directly calculates the discrimination value of the index word. Then, the discrimination value calculation module 170 obtains the discrimination values of the new words and the discrimination values of partial strings of existing words, and estimates the discrimination value of the related word 148 according to a minimum, a maximum, an arithmetic mean, or a weighted average of the discrimination values. When partial strings of existing words cannot be found in the index word list 144, the word segmentation module 146 parses the strings to obtain at least one index word. Then, the discrimination value calculation module 170 calculates the discrimination value of each parsed index word to obtain the discrimination values of the new words and the discrimination values of partial strings of existing words, and further estimates the discrimination value of the related word 148 according to a minimum, a maximum, an arithmetic mean, or a weighted average of the discrimination values.

Additionally, the related word recommendation module 174 compares the discrimination value of each related word 148 in the log-based related word list 162 with the discrimination value of each related word 148 in the content-based related word list 152 to select the top P related words 148 having largest discrimination values from the content-based related word list 152 and the log-based related word list 162 according to the sorting of each related word 148, wherein P is a positive integer, such as P=5 or P>5. Thus, the related search word list 176 suitable for recommendation is completed.

Refer to FIGS. 1 and 2. FIG. 2 is a schematic diagram of a system 100 for adaptively adjusting the related search word list 176 performing an initial search process according to an embodiment of the present disclosure. The initial search process includes steps S11-S14. Refer to steps S11 and S12. In step S11, whether the search word 112 can be found in the search log is determined. If yes, the process proceeds to step S12, whether the cumulative search count of the search word 112 is less than the second threshold is determined. When both conditions as disclosed in steps S11 and S12 are met, the process evolution module 140 performs an initial search process. Meanwhile, since the search word 112 cannot be found in the historical search log 122 or the cumulative search count of the search word 112 is very small, the search engine 102 is unable to find out a historical search word suitable for recommendation from the current search word 112. Refer to steps S13 and S14. In step S13, whether the search word 112 can be found in the text 114 is determined. When the search word 112 cannot be found, then the process proceeds to S14, the word segmentation module 146 parses the search word 112 into at least one index word according to the index word list 144, and then returns to step S11 to determine whether the index word can be found in the search log. When the search word 112 can be found in the text 114, then the content-based related word generation module 150 finds out at least one related word 148 related to the attributes or content of the search word 112 from the text 114 according to text 114 and the index word list 144.

Refer to FIGS. 1 and 3. FIG. 3 is a schematic diagram of a system 100 for adaptively adjusting related search words optimizes the middle search process according to an embodiment of the present disclosure. The process of the present embodiment is similar to the process of the above embodiment except for step S12. In step S12 of the present embodiment, when the cumulative search count of the search word 112 is greater than the second threshold but less than the first threshold, then the system 100 accumulates a certain number of search logs for the process evolution module 140 to perform a middle search process. Meanwhile, the log-based related word generation module 160 finds out at least one historical search word related to the attributes or content of the search word 112 according to a historical search log 122. Therefore, the search engine 102 not only finds out the related word 148 suitable for recommendation according to the current search word 112 but also finds out the related word 148 suitable for recommendation according to the text 114 and the index word list 144. Then, the discrimination value calculation module 170 and the new word recognition module 142 generate the discrimination values of the related words from which the related word recommendation module 174 select and find out at least one related word 148 and/or at least one historical search word most related to the attributes or content of the search word 112 to obtain an optimized related search word list 176.

Refer to FIGS. 1 and 4. FIG. 4 is a schematic diagram of a system 100 for adaptively adjusting related search words performing a late search process according to an embodiment of the present disclosure, wherein steps S13 and S14 of the initial search process are omitted, and only steps S11 and S12 are performed. In the present embodiment, when the search word 112 is found in the historical search log 122 and the cumulative search count of the search word 112 is greater than the first threshold and greater than the second threshold, this implies that the system 100 has accumulated a sufficient number of historical search logs 122 for the process evolution module 140 to perform a late search process. Meanwhile, the log-based related word generation module 160 finds out at least one historical search word related to the attributes or content of the search word 112 according to a historical search log 122. Therefore, the search engine 102 directly finds out a related word 148 suitable for recommendation from a historical search log 122 according to the current search word 112 instead of finding out a related word 148 suitable for recommendation from the text 114 and the index word list 144. The first threshold and the second threshold are cumulative search counts of the search word 112, and can be determined according to the large sample size (the sample size is greater than 30) concept of statistical theory or can be determined by a similar-sized search system used in the same application field. For example, in the shopping search field, the first threshold and the second threshold can be set in terms of the cumulative search count sufficient to find a related word acceptable to the user in the scenario of similar product quantity. Or, during the use of the search system 100, the experts in the same application field can dynamically adjust the first threshold and the second threshold according to the search result to adjust the speed at which the initial search process evolves to the late search process or the speed at which the middle search process or the late search process regresses to its previous search process.

In an embodiment, the method for adaptively adjusting the related search word list 176 can be implemented as a software program, which can be stored in a non-transitory computer readable medium, such as hard disc, optical disc, flash drive, memory, or other program storage device. When a processor loads in the software program from a non-transitory computer, the processes of the method as indicated in FIGS. 2, 3 and 4 can be performed, such that an initial search process evolves to a middle search process, which further evolves to a late search process.

In an embodiment, the system 100 for adaptively adjusting related search words includes a processor and a program storage device. The processor can execute one or more than one computer executable command. The program storage device stores the computer program module that can be performed by the processor. When the computer program module is performed by the processor, the processor performs each step of FIGS. 2, 3 and 4.

In another embodiment, each of the search log collection module 120, the threshold setting module 130, the process evolution module 140, the new word recognition module 142, the content-based related word generation module 150, the log-based related word generation module 160, the discrimination value calculation module 170, and the related word recommendation module 174 disclosed above can be implemented as a software unit or a hardware unit. Or, some modules can be combined and realized as software, and some other modules are combined and realized as hardware. The module realized as software can be regarded as an operational process, such as search log collection process, threshold setting process, process evolution process, new word recognition process, text related word generation process, log related word generation process, related word discrimination calculation process, and related word recommendation process, and can be loaded into the processor to perform corresponding functions. The module can be realized as hardware such as microcontrollers, microprocessors, digital signal processors, an application specific integrated circuit (ASIC), a digital logic circuit, or a field programmable gate array (FPGA).

A system and a method for adaptively adjusting related search words are disclosed in above embodiment of the present disclosure. The system and the method of the present disclosure are capable of adaptively adjusting related search words according to the number of search logs accumulated in the system to provide suitable recommendation of related search words to the user. The system and the method of the present disclosure reduce the manpower and time cost required for the development of system programs, do not need to learn the first set of weight combination, and are free of the learning problem regarding vertical domain conversion. Additionally, the system and the method of the present disclosure consider the situation that the search word recommendation process keeps varying with the number of search logs, and therefore create a search word recommendation mechanism with higher accuracy, not only avoiding the problem that the homogenized search word recommendation process may generate related words that are irrelevant to the attributes or content of the search word but also increasing convenience of management and flexibility of use.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A system for adaptively adjusting related search words, comprising:
    an input device configured to receive a search word, wherein the search word is received by the system for analysis; and
    a processor for performing executable modules, the executable modules comprising:
        a search log collection module configured to accumulate a cumulative search count of the search word and form a historical search log by collecting search logs that include information of the search word, attributes or content of the search word, and store the historical search log in a database;
        a threshold setting module configured to set a first threshold and a second threshold in terms of a number of search logs, wherein the first threshold is greater than the second threshold; and
        a process evolution module configured to adjust a search process performing by the processor according to the number of search logs, and the search process includes an initial search process, a middle search process and a late search process to adaptively adjust a related search word list of the received search word for recommendation,
    wherein when the search log collection module accumulating the cumulative search count of the search word is greater than the first threshold, the process evolution module performs the late search process to find at least one historical search word related to the attributes or content of the search word according to the historical search log and a log-based related word list generating in accordance with the historical search log to provide the related search word list,
    wherein, when the search log collection module accumulating the cumulative search count of the search word is less than the second threshold, the process evolution module performs the initial search process to find out at least one related word related to the attributes or content of the search word from a text and a content-based relate word list generating in accordance with the text to provide the related search word list,
    wherein, when the search log collection module accumulating the cumulative search count of the search word is greater than the second threshold but less than the first threshold, the process evolution module optimizes the middle search process to find out at least one related word from at least one of the text, the content-based related word list at least one historical search word from the log-based related word list, the historical search log that are most related to the attributes or content of the search word to provide the related search word list.

2. The system according to claim 1, further comprising:
an index word list; and
a content-based related word generation module configured to analyze the text to find out top M index words most related to the search word according to the index word list to generate the content-based related word list when the cumulative search count of the search word is less than the first threshold in the initial and the middle search process; and
a log-based related word generation module configured to analyze a strength of relevance between any two historical search words in the historical search log to find out top N historical search words most related to the search word to generate the log-based related word list when the cumulative search count of the search word is greater than the second threshold in the middle and the late search process.

3. The system according to claim 2, wherein the content-based related word generation module calculates the strength of relevance according to a probability at which the search word and the index words appear in the text separately or concurrently, separate occurrence represents low strength of relevance, and concurrent occurrence represents high strength of relevance.

4. The system according to claim 2, wherein the log-based related word generation module calculates the strength of relevance according to a probability at which one or more attributes or content of the search word and the historical search words appear in the historical search log separately or concurrently, separate occurrence represents low strength of relevance, and concurrent occurrence represents high strength of relevance.

5. The system according to claim 2, further comprising:
a discrimination value calculation module configured to calculate a discrimination value of each related word according to the index word list, the log-based related word list and the content-based related word list; and
a related word recommendation module configured to compare the discrimination value of each related word in the log-based related word list with the discrimination value of each related word in the content-based related word list to select top P related words having largest discrimination values from the content-based related word list and the log-based related word list according to a sorting of the discrimination value of each related word.

6. The system according to claim 5, wherein the discrimination value calculation module calculates the discrimination value according to a degree of difference of each related word appearing in the text, and the degree of difference is related to a frequency at which each related word appears in the text or a plurality of texts.

7. The system according to claim 2, further comprising:
a word segmentation module configured to receive the search word, wherein when the search word cannot be found in the text, the word segmentation module parses the search word into at least one index word according to the index word list.

8. The system according to claim 5, further comprising:
a new word recognition module configured to recognize whether the related word contains a new word which cannot be found in the index word list, wherein when the new word is included in the related word, the discrimination value calculation module calculates the discrimination value of the related word according to the related word and the new word contained therein.

9. The system according to one of claim 1, wherein the system is performed by a processor or a software program loaded into the system by the processor.

10. A method for adaptively adjusting related search words, performed by a processor, the method comprising:
performing an input process to receive a search word;
performing a search log collection process executed by the processor to accumulate a cumulative search count of the search word and form a historical search log by collecting search logs that include information of the search word, attributes or content of the search word, and store the historical search log in a database;
performing a threshold setting process executed by the processor to set a first threshold and a second threshold in terms of a number of search logs, wherein the first threshold is greater than the second threshold; and
performing a process evolution process executed by the processor to adjust a search process performing by the processor according to the number of search logs, and the search process includes an initial search process, a middle search process and a late search process to adaptively adjust a related search word list of the received search word for recommendation,
wherein when the search log collection process accumulating the cumulative search count of the search word is greater than the first threshold, the late search process is performed and at least one historical search word related to the attributes or content of the search word is found out according to the historical search log and a log-based related word list generating in accordance with the historical search log to provide the related search word list,
wherein, when the search log collection process accumulating the cumulative search count of the search word is less than the second threshold, the initial search process is performed to find out at least one related word related to the attributes or content of the search word from a text and a content-based relate word list generating in accordance with the text to provide the related search word list,
wherein, when the search log collection process accumulating the cumulative search count of the search word is greater than the second threshold but less than the first threshold, the middle search process is optimized and performed to find out at least one related word from at least one of the text, the content-based related word list and/or at least one historical search word from the log-based related word list, the historical search log that are most related to the attributes or content of the search word to provide the related search word list.

11. The method according to claim 10, further comprising:
creating an index word list; and
performing a text related word generation process to analyze the text to find out top M index words most related to the search word according to the index word list to generate the content-based related word list when the cumulative search count of the search word is less than the first threshold in the initial and the middle search process; and
performing a log related word generation process to analyze a strength of relevance between any two historical search words in the historical search log to find out top N historical search words most related to the search word to generate the log-based related word list when the cumulative search count of the search word is greater than the second threshold in the middle and the late search process.

12. The method according to claim 11, wherein the text related word generation process is performed to calculate the strength of relevance according to a probability at which the search word and the index words appear in the text separately or concurrently, separate occurrence represents low strength of relevance, and concurrent occurrence represents high strength of relevance.

13. The method according to claim 11, wherein the log related word generation process is performed to calculate the strength of relevance according to a probability at which the attributes or content of the search word and the historical search words appear in the historical search log separately or concurrently, separate occurrence represents low strength of relevance, and concurrent occurrence represents high strength of relevance.

14. The method according to claim 11, further comprising:
performing a related word discrimination calculation process to calculate a discrimination value of each related word according to the index word list, the log-based related word list and the content-based related word list; and
performing a related word recommendation process to compare the discrimination value of each related word in the log-based related word list with the discrimination value of each related word in the content-based related word list to select top P related words having largest discrimination values from the content-based related word list and the log-based related word list according to a sorting of the discrimination value of each related word.

15. The method according to claim 14, wherein the related word discrimination calculation process is performed to calculate the discrimination value according to a degree of difference of each related word appearing in the text, and the degree of difference is related to a frequency at which each related word appears in the text or a plurality of texts.

16. The method according to claim 11, further comprising:
performing a word parsing process to receive the search word, wherein when the search word cannot be found in the text, the search word is parsed into at least one index word according to the index word list.

17. The method according to claim 14, further comprising:
performing a new word recognition process to recognize whether the related word contains a new word which cannot be found in the index word list, wherein when the new word is included in the related word, the discrimination value of the related word is calculated according to the related word and the new word contained therein.

* * * * *